(12) United States Patent
Miyake et al.

(10) Patent No.: US 6,906,815 B1
(45) Date of Patent: Jun. 14, 2005

(54) PRINT SYSTEM CAPABLE OF INFORM USER OF PROGRESS OF PRINT OPERATIONS

(75) Inventors: Keiji Miyake, Nagoya (JP); Kiyoji Muramatsu, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/383,754

(22) Filed: Aug. 26, 1999

(30) Foreign Application Priority Data

Aug. 26, 1998 (JP) ............................................ 10-240181
Sep. 18, 1998 (JP) ............................................ 10-264780

(51) Int. Cl.$^7$ ............................. G06F 3/12; G06F 13/00
(52) U.S. Cl. ...................... 358/1.15; 358/1.14; 358/1.9
(58) Field of Search ................................ 358/1.15, 1.1, 358/1.13, 1.9, 1.12, 1.14, 1.17, 1.18, 504, 426.06; 709/102, 103, 223, 224

(56) References Cited

U.S. PATENT DOCUMENTS

| | | | | |
|---|---|---|---|---|
| 4,930,101 A | * | 5/1990 | Wong et al. ................. | 364/900 |
| 5,668,641 A | * | 9/1997 | Tsukamoto et al. ......... | 358/436 |
| 5,862,404 A | * | 1/1999 | Onaga ......................... | 395/828 |
| 6,055,063 A | * | 4/2000 | Yang et al. ................. | 358/1.15 |
| 6,337,745 B1 | * | 1/2002 | Aiello, Jr. et al. ......... | 358/1.15 |
| 6,469,795 B2 | * | 10/2002 | Beaudet et al. ............ | 358/1.14 |

* cited by examiner

Primary Examiner—Douglas Tran
(74) Attorney, Agent, or Firm—Pitney Hardin LLP (57) ABSTRACT

A RIP(20) calculates total line number of print data when converting original data to the print data. When a printer (30) is requested by the RIP to send a printed line number, the printer (30) detects the physical position of a print head (56) using a sensor (59) calculates a printed line number, and transmits the obtained printed line number to the RIP (20). The RIP (20) notifies a user of progress of print operations based on the total line number and the received printed line number.

2 Claims, 10 Drawing Sheets

PRINT SYSTEM CAPABLE OF INFORM USER OF PROGRESS OF PRINT OPERATIONS

BACKGROUND OF THE INVENTION

1. Field of the Invention

The present invention relates to a print system capable of notifying a user of progress of print operations.

2. Description of the Related Art

There has been known a conventional print system including an information processing terminal for generating original data, a printer controller for converting the original data Into print data, and a printer for executing print operations based on the print data.

Specifically, the information processing terminal generates original data. The original data may be data in a page description language (PDL), such as PostScript, or image data, such as Tagged Image File Format (TIFF) image data, Joint Photographic coding Experts Group (JPEG) image data. Because the original data cannot be processed by the printer, the printer controller, such as a raster image processor (RIP), converts the original data into print data which can be processed by the printer. The print data is then transmitted to the printer, and temporarily stored in a buffer memory or a storage device of the printer. The printer performs print operations based on the print data for forming images on a recording medium.

Because of a limited capacity of the buffer memory, not all print data can be stored in the buffer memory at once. Therefore, after the print operations are performed based on print data stored in the buffer memory, the print data is cleared from the buffer memory, thereby generating free space in the buffer memory. Then, subsequent print data is received and stored in the buffer memory. This pattern is repeated until all print data is transmitted from the printer controller.

In a small print system, the printer controller is provided internally of the information processing terminal. However, in large scale print systems, such as computer network with a larger printer capable of printing banners several meters long, the printer controller is provided as a separate device from the information processing terminal in order to lighten the processing burden on the information processing terminal. In this case, the printer controller is connected between the information processing terminal and the printer. In both cases, the printer controller receives all original data from the information processing terminal over the network at one time, converts the receive original data into print data, and transmits the print data to the printer a portion at a time in a plurality of steps.

The print systems described above determine the progress of print operations being performed by the printer and notify the user. This determination is made based on the amount of print data that remains in the printer controller, untransmitted to the printer. However, the progress of print operations at the printer is not directly related to the amount of the untransmitted print data. For example, print data can remain unprinted in the printer, even if all the print data is transmitted from the printer controller to the printer. However, when the printer controller completely transmits all print data to the printer, then the user will be notified that printing operations have been completed even if unprinted print data still remains in the buffer memory of the printer. In this way, the progress of print operations can not be accurately notified.

Moreover, the printer may be required to stop print operations for some reasons even when the printer retains some unprinted print data. The user cannot accurately grasp the progress of the print operation, especially when his or her desk is located far away from the printer.

SUMMARY OF THE INVENTION

It is an objective of the present invention to overcome the above problems and also to provide a print system capable of notifying a user of progress of print operations performed at a printer.

In order to achieve the above and other objectives, there is provided a print system including a terminal, a printer controller and a printer. The terminal generates original data. The printer controller converts the original data into print data. The printer performs print operations for forming an image on a recording medium based on the print data. The printer controller is connected between the terminal and the printer. The printer includes a condition detector that detects a condition of the print operations and transmitting means for transmitting condition data indicating the condition of the print operations to at least one of the terminal and the printer controller. At least one of the terminal and the printer controller comprises receiving weans for receiving the condition data. At least one of the terminal and the printer controller comprises notifying means for notifying a user of progress of the print operations based on the condition data.

There is also provided a printer controller connected between a terminal and a printer. The terminal generates original data, and the printer performs print operations based on print data for forming an image on a recording medium. The printer detects a condition of the print operations and transmits condition data indicating the condition. The printer controller includes converting means for converting the original data into the print data, receiving means for receiving the condition data from the printer, and notifying means for notifying a user of progress of the print operations based on the condition data.

Further, there is provided a printer controller connected between a terminal and a printer. The terminal generates original data, and the printer performs print operations based on print data for forming an image on a recording medium. The printer detects a condition of the print operations and transmits condition data indicating the condition. The printer controller includes converting means for converting the original data into the print data, and relaying means for receiving the condition data from the printer and transmitting the condition data to the terminal.

Still further, there is provided a printer connected to a printer controller that converts original data received from a terminal into print data. The printer includes a print unit that performs print operations based on the print data for forming an image on a recording medium, a detector that detects a progress of the print operations, and transmitting means for transmitting progress data indicating the condition of the print operations to the printer controller.

There is also provided a print progress notifying device including counting means for counting a printed raster number, detecting means for detecting a total raster number of print data, a timer that measuring a required time duration from when print operations are started to when the counting means counts the printed raster number, and predicting means for predicting at least one of a remaining time duration required for completing the print operations and a completion time at which the print operations are completed, based on the printed raster number, the total raster number, and the required time duration.

It should be noted that in the following description, a CPU 102 of an RIP computer 24 and programs stored in a RAM 108 together serve as the receiving means, the relaying means, the predicting means, the converting means, and the transmitting means of the printer controller. A display 21 and a display 11 serves as the notifying means. A sensor 59 or variables stored in a RAM 76 serves as the condition detector or the counting means. A CPU 72 of a printer 30 serves as the transmitting means of the printer.

DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Print systems according to preferred embodiments of the present invention will be described while referring to the accompanying drawings.

Figure 1:
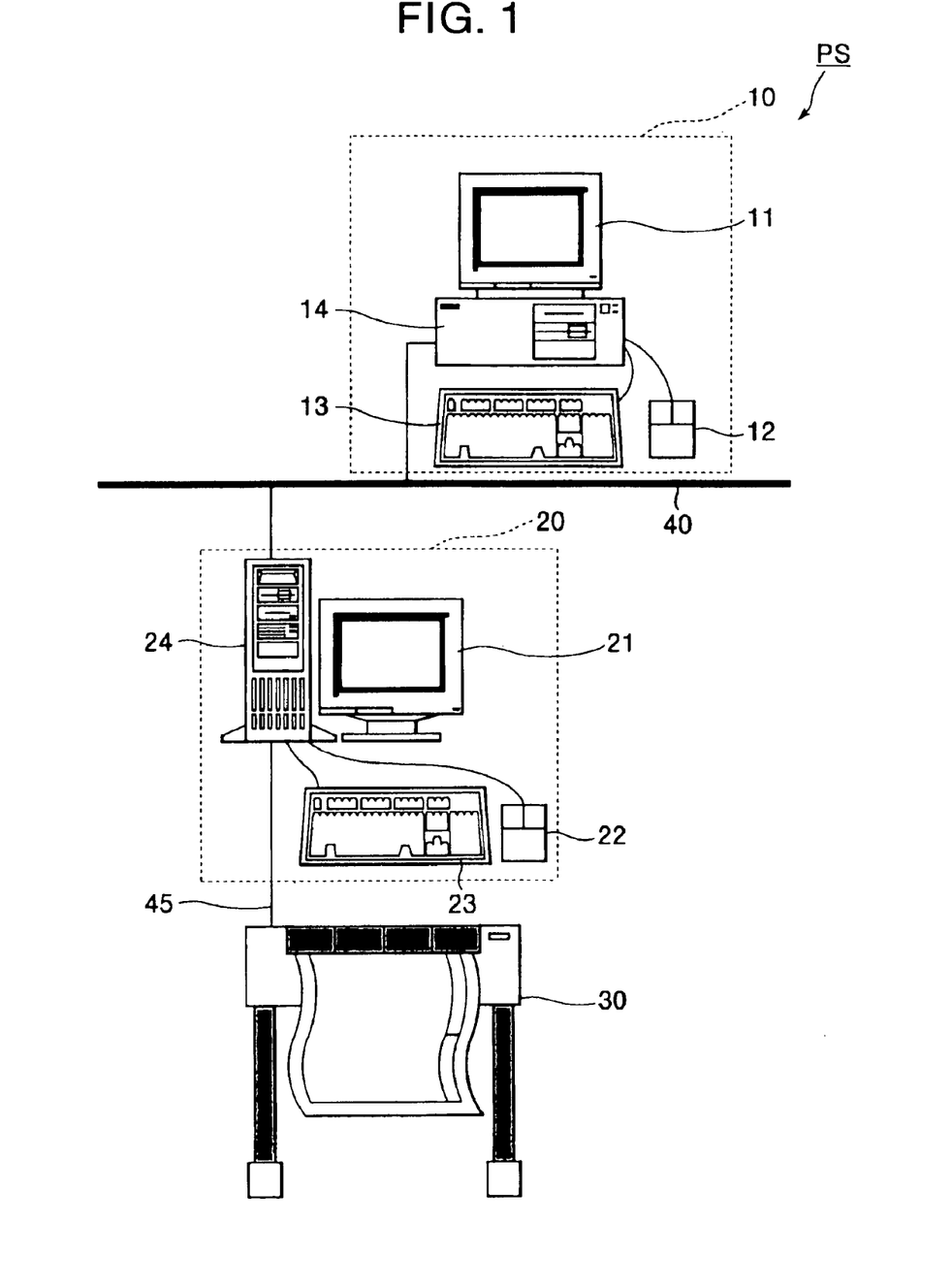
FIG. 1 is a schematic view showing a print system according to embodiments of the present invention.

First, a print system PS according to the embodiments of the present invention will be described while referring to FIG. 1. The print system PS includes an information processing terminal 10, a raster image processor (RIP) 20, and a printer 30. The information processing terminal 10 is connected to the RIP 20 by a network 40, such as a local area network (LAN). The printer 30 is connected to the RIP 20 by a line 45. The information processing terminal 10 can be a personal computer, and the printer 30 can be a printer plotter, an ink jet printer, a laser printer, or any other variety of printer.

It should be noted that the print system PS according to the present embodiment includes only a single information processing terminal 10 and a single printer 30. However, a plurality of information processing terminals 10 and a plurality of printers 30 can be included. In this case, the information processing terminals 10 are connected to the network 40, and the printers 30 are connected to the RIP 20.

Next, the information processing terminal 10 will be described while referring to FIG. 1. As shown in FIG. 1, the information processing terminal 10 includes a display 11, a mouse 12, a keyboard 13, and a computer 14. The display 11, the mouse 12, and the keyboard 13 are individually connected to the computer 14. The computer 14 is installed with variety of application software, such as word processing software, image processing software, and graphic software. The computer 14 generates original data, such as text data, TIFF image data, JPEG image data, and graphic data, using the application software based on instructions from a user. When the user inputs a print start command, the computer 14 transmits the original data over the network 40 to the RIP 20.

Next, the RIP 20 will be described while referring to FIGS. 1 and 3. The RIP 20 similarly includes a display 21, a mouse 22, a keyboard 23, and an RIP computer 24. The display 21, the mouse 22, and the keyboard 23 are individually connected to the RIP computer 24.

Figure 3:
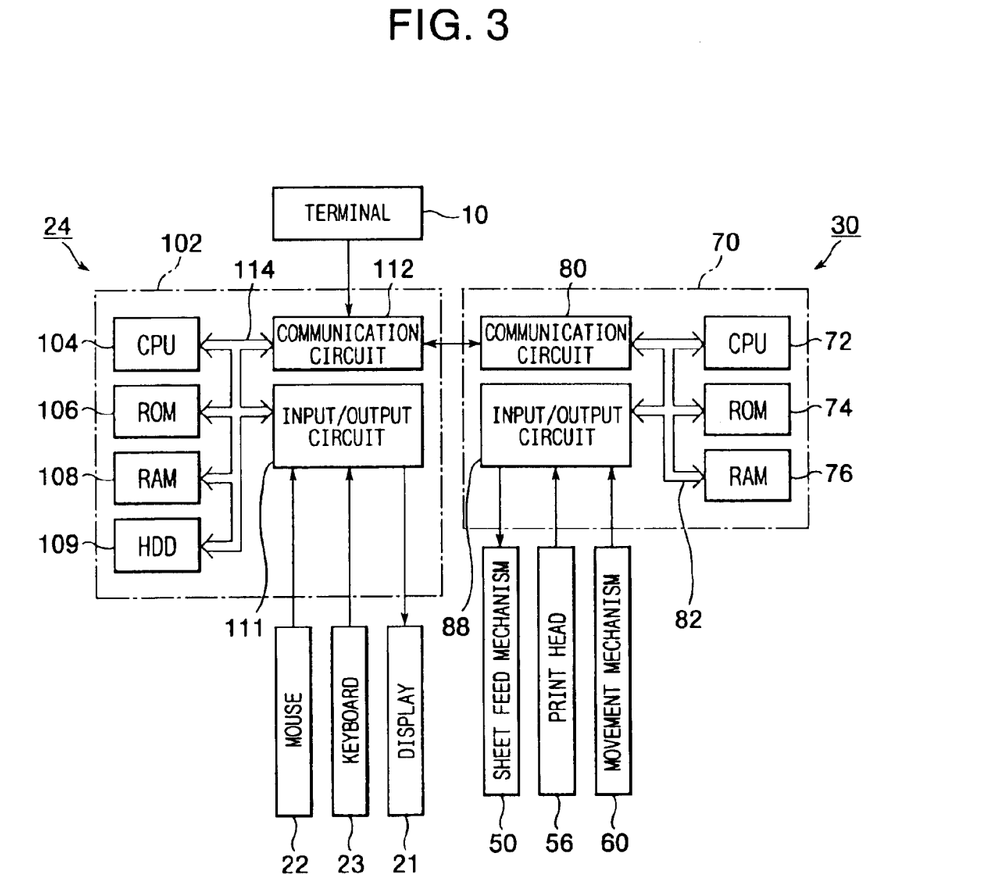
FIG. 3 is a block diagram showing electric configuration of the print system of FIG. 1.

As shown in FIG. 3, the RIP computer 24 has an electrical control circuit 102. The control circuit 102 includes a well-known logic computation circuit having a central processing unit (CPU) 104, a read-only memory (ROM) 106, a random access memory (RAM) 108, and a hard disk 109, and also includes an input/output circuit 111 and a communication circuit 112, all connected to each other by a common bus 114. The ROM 106 stores control programs. The RAM 108 stores various data, variables, and programs. The input/output circuit 111 is connected to the keyboard 23, the display 21, and the mouse 22. The communication circuit 112 is connected to the information processing terminal 10 and the printer 30.

The CPU 104 receives signals from the keyboard 23 and the mouse 22, and transmits data to the display 21 over the input/output circuit 111. Also, the CPU 104 executes transmission/reception of data between the CPU 104 and the information processing terminal 10 and between take CPU 104 the printer 30, based on these signals and on data and programs stored in the RAM 108, the hard disk 109, and the ROM 106.

When the RIP 20 receives original data from the information processing terminal 10, the original data is temporarily stored in the hard disk 109 of the RIP 20. Then, the RIP 20 outputs a print start command to the printer 30. At the same time, the original data is decoded according to the control program, and converted into print data. Then, the print data is transmitted to the printer 30 a portion at a time in a plurality of steps. The print data may be bit map data developed in dot units, which is the basic data unit used in printing. It should be noted that when a print head 56 (described later) is used to print in both scanning directions, the print data for the return scan portion is inverted with respect to normal print data.

Figure 2:
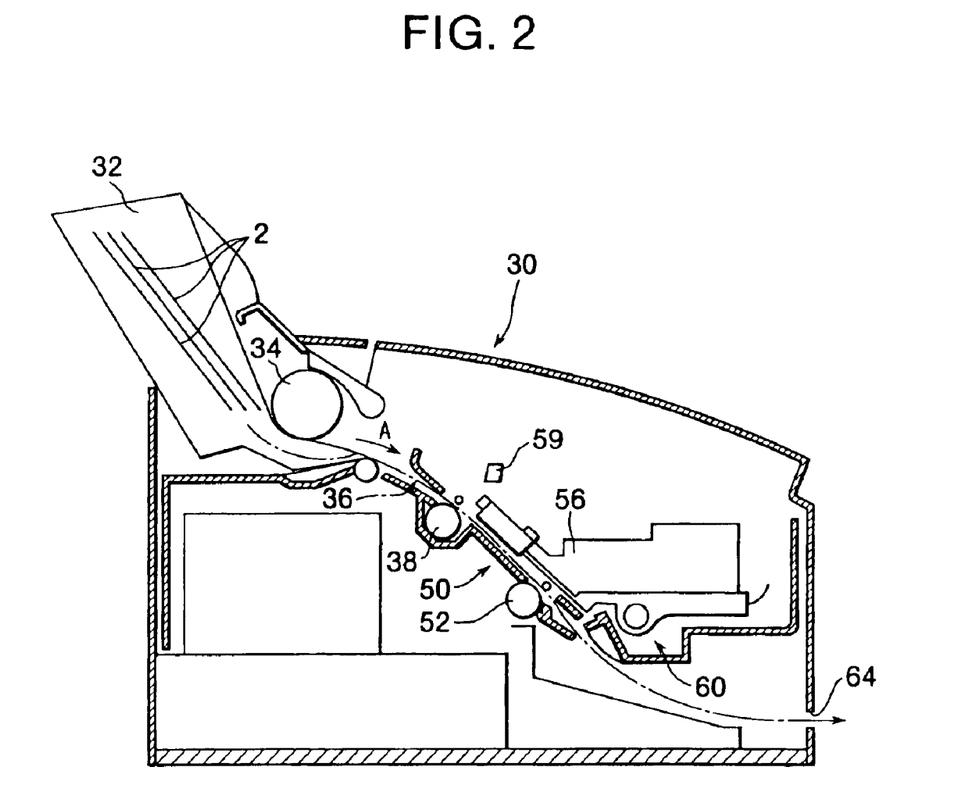
FIG. 2 is a cross-sectional view showing a printer of the print system of FIG. 1.

Next, the printer 30 will be described while referring to FIGS. 2 and 3. As shown in FIG. 2, the printer 30 includes a sheet supply mechanism 32, a sheet supply roller 34, a sheet feed mechanism 50, a print head 56, a sensor 59, and a movement mechanism 60. Internal components of the printer 30 are disposed to define a sheet feed path 36 along which recording sheets 2 are transported one sheet at a time. The sheet supply mechanism 32 houses a plurality of recording sheets 2 in a stacked condition. The sheet supply roller 34 is disposed adjacent to the lower end of the sheet supply mechanism 32 for feeding the recording sheets 2 one at a time from the sheet supply mechanism 32.

The sheet feed mechanism 50 includes a first feed roller 38 and a second feed roller 52, disposed along the transport pathway 36 in this order from the sheet supply mechanism 32. The first and second feed rollers 38, 52 feed the recording sheet 2 past the print head 56 in an auxiliary scanning direction indicated by an arrow A in FIG. 2, then discharge the recording sheet 2 out of the printer 30 through a discharge port 64.

The movement mechanism 60 is disposed above the transport pathway 36, and includes a carriage 58. The print head 56 is mounted on the carriage 58. The movement mechanism 60 controls the carriage 58 to scan in a main scanning direction perpendicular to the auxiliary scanning direction A while the print head 56 ejects ink droplets onto the recording sheet 2. The sensor 59 detects a physical position of the print head 56.

It should be noted that the printer 30 can be of the type capable of printing banners several meters wide and several tens of meters long. In this case, a roll of recording sheet is used as a recording medium, rather than a cut sheet.

As shown in FIG. 3, the printer 30 further includes an electrical control circuit 70. The control circuit 70 is a well-known logic computation circuit including a CPU 72, a ROM 74, a RAM 76, and further includes an input/output circuit 88 and a communication circuit 80, all connected to each other by a common bus 82. The input/output circuit 88 is connected to the sheet feed mechanism 50, the print head 56, and the movement mechanism 60. The communication circuit 80 is connected to the communication circuit 112 of the RIP 20.

The CPU 72 executes overall control of the printer 30. For example, the CPU 72 receives print data from the RIP 20 over the communication circuit 80. Also, the CPU 72 controls the sheet feed mechanism 50, the print head 56, and the movement mechanism 60 so as to execute printing operations, based on the print data, other data and programs stored in the ROM 74 and the RAM 76.

When the printer 30 receives print data from the RIP 20, the print data is stored in a buffer memory (not shown) provided in the RAM 76. Then, a predetermined number of rasters' worth of print data is retrieved from the buffer memory at one time. When free space is generated in the buffer memory, the printer 30 receives subsequent print data from the RIP 20, and stores the print data into the buffer memory. These operations are repeated until print operations have been performed for all print data.

It should be noted that each raster's worth of print data includes bit map data for driving the print head 56 to print a single dot line in single scan in the main scanning direction. Because the print head 56 is provided with a plurality of nozzles aligned in the auxiliary direction A, the print head 56 can print the plurality of raster in a single scan. In the present embodiment, the print head 56 is provided with 32 or 64 nozzles, so 32 or 64 rasters's worth of data is retrieved from the buffer memory each time.

Figure 4:
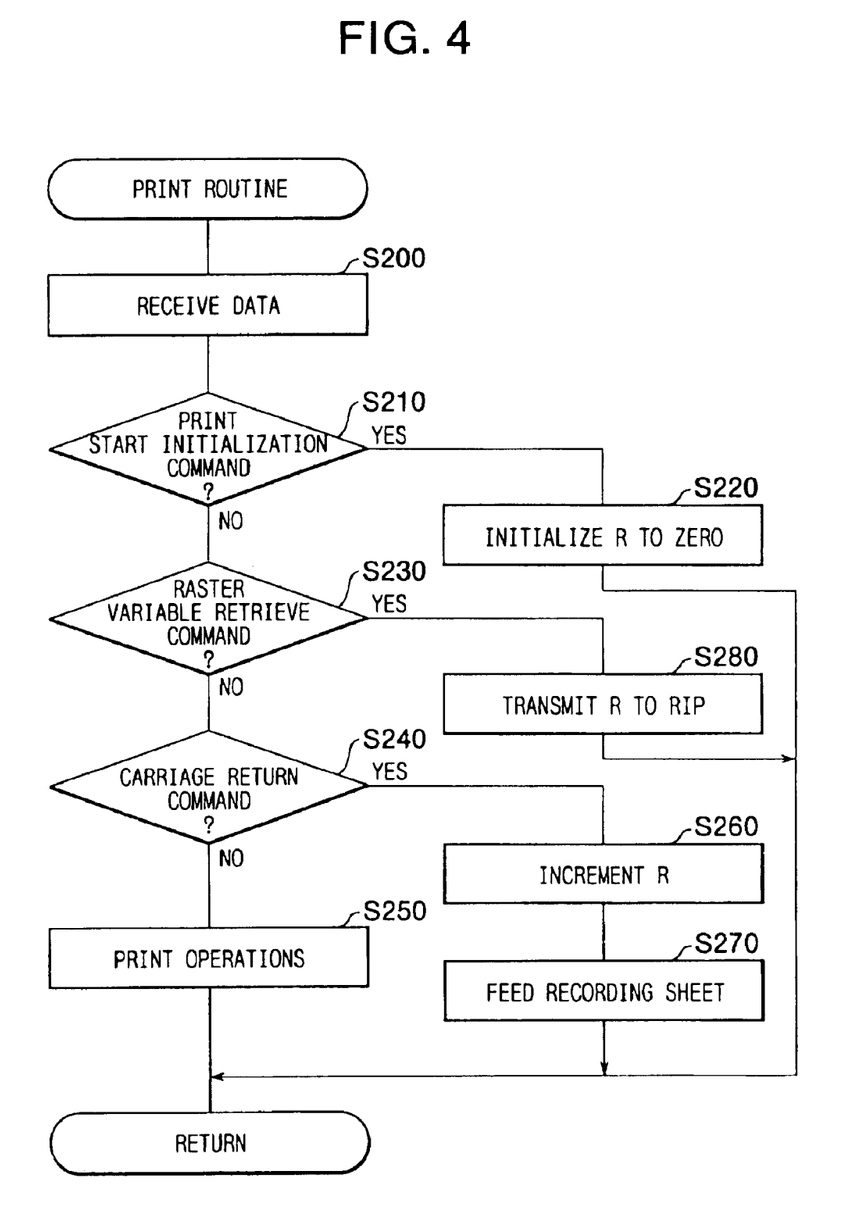
FIG. 4 is a flowchart representing a print routine according to a first embodiment of the present invention.
Figure 5:
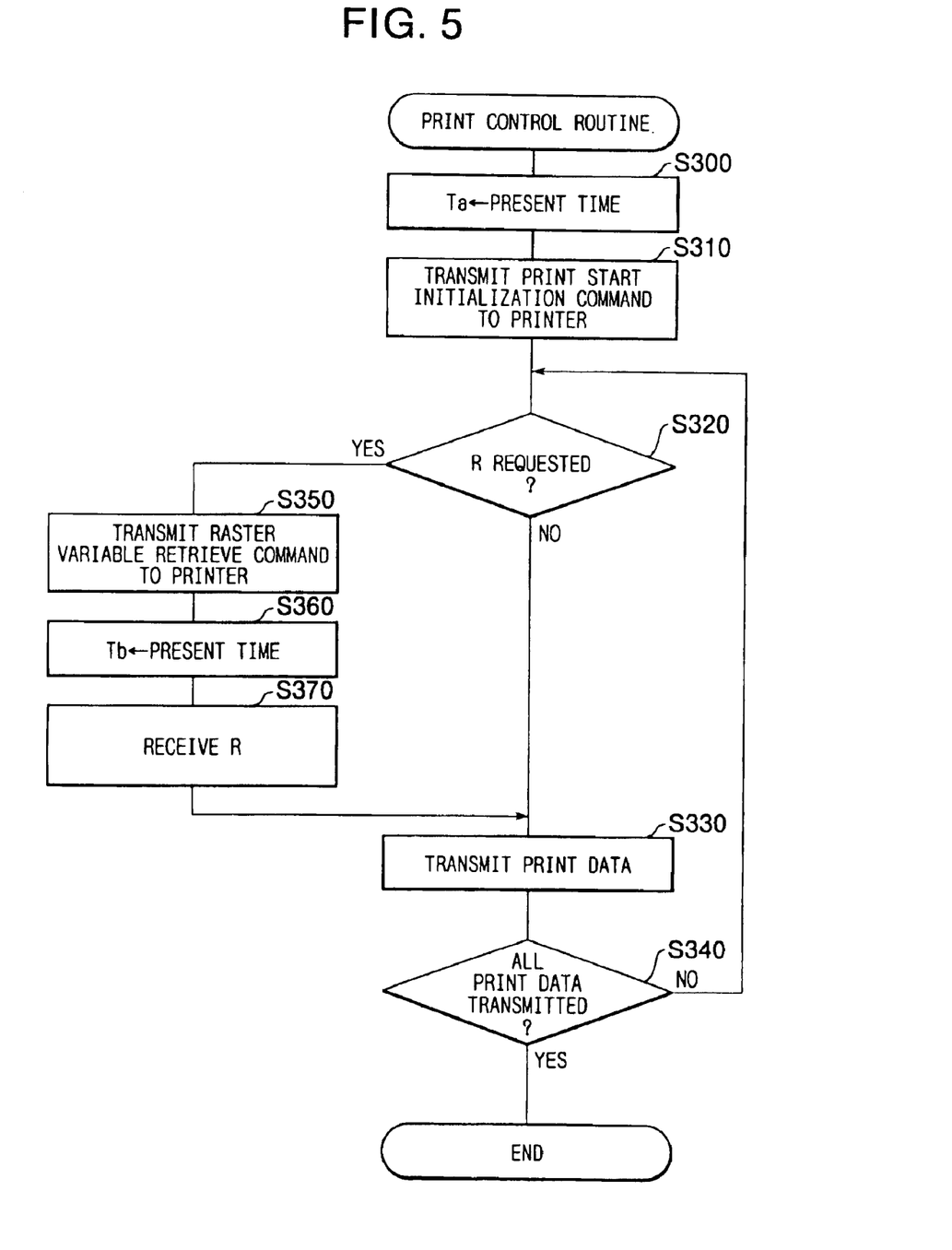
FIG. 5 is a flowchart representing a print control routine according to the first embodiment.
Figure 6:
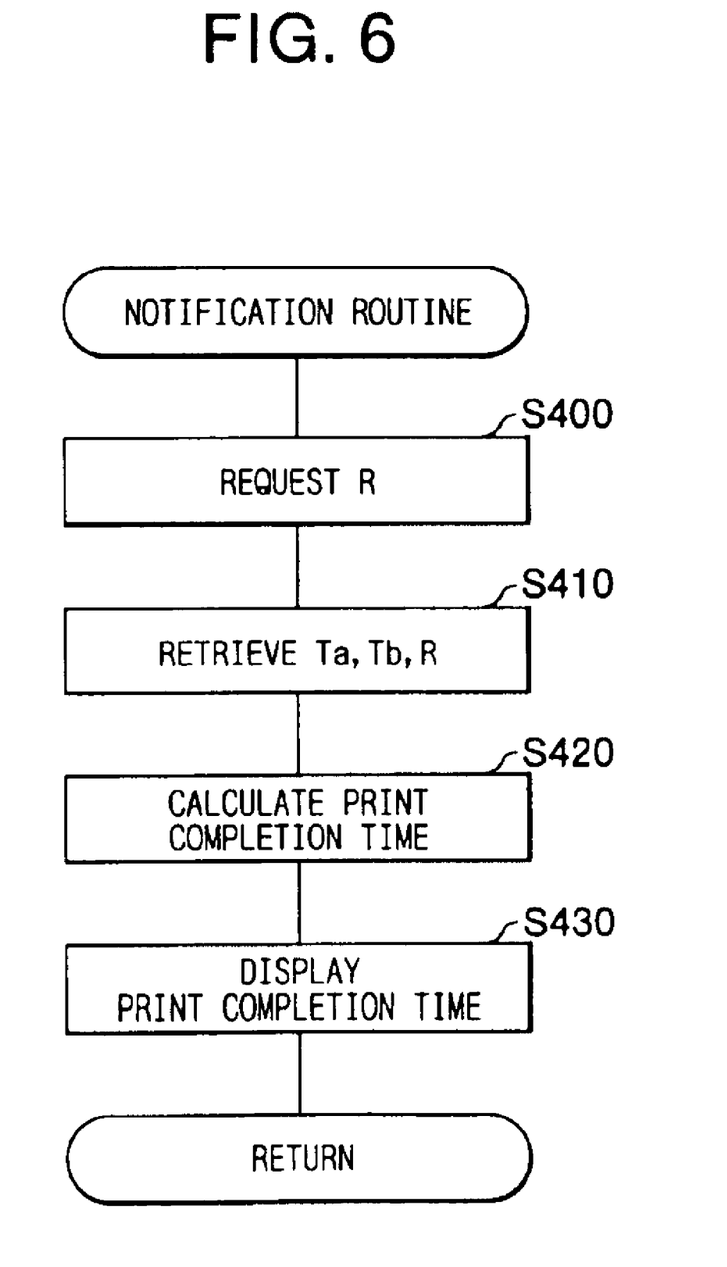
FIG. 6 is a flowchart representing a notification routine according to the first embodiment.

Next, control processes according to the first embodiment of the present invention will be described while referring to the flowcharts shown in FIGS. 4 to 6. The control processes include a print routine, a print control routine, and a notification routine.

First, the print routine will be described while referring to the flowchart shown in FIG. 4. The print routine is executed by the control circuit 70 of the printer 30 when any data is received from the RIP 20.

First, in S200, data received from the RIP 20 is stored in the buffer memory, and a single a command is retrieved from the data in buffer memory.

Then in S210, it is determined whether or not the retrieved command is a print start initialization command. If so (S200:YES), the routine proceeds to S220, wherein a raster variable R is initialized to zero. Then, the present routine returns to S200.

On the other hand, if S210 results in a negative determination (S210:NO), then in S230, it is determined whether or not the retrieved command is a raster variable retrieve command. If not (S230:NO) then in S240, it is determined whether or not the retrieved command is a carriage return command for returning a scanning direction of the carriage 58. If not (S240:NO), this means that the retrieved command is a print data, so in S250, print operations are performed based on the print data for forming an image on the recording sheet 2. Then, the present routine returns, and repeats the processes in S200 and on.

When S240 results in an affirmative determination (S240:YES), then in S260, the raster variable R is incremented by a predetermined amount that corresponds to the number of nozzles of the print head 56, that is, 32 or 64 in the present embodiment. Next in S270, the sheet feed mechanism 50 feeds the recording sheet 2 by a distance equivalent to 32 or 64 lines. Then, the present routine returns, and repeats the processes in S200 and on. In this way, the raster variable R is incremented in S260 each time the print head 56 performs a single scan's worth of printing.

If the retrieved command is the raster variable retrieve command (S230:YES), then the present routine proceeds to S280, wherein the raster variable R is transmitted to the RIP 20. Then, the process returns, and repeats processes in S200 and on.

Next, the print control routine will be described while referring to the flowchart shown in FIG. 5. The print control routine is executed by the CPU 104 of the RIP 20 when a print start command is received from the information processing terminal 10.

First in S300, the RIP 20 stores the present time as a start time Ta in the RAM 108. Next in S310, a print start initialization command is transmitted to the printer 30. Then in S320, it is determined whether or not the raster variable R has been requested. If not (S320:NO), then in S330, print data is transmitted to the printer 30. Then in S340, it is determined whether or not all print data has been transmitted to the printer 30. If so, the routine is temporarily ended. On the other hand, if not (S340:NO), the routine returns to S320. In this way, the print data is transmitted from the RIP 20 to the printer 30 in a portion at a time in a plurality of steps. This enables storing a subsequent portion of the print data in the buffer memory of the printer 30 when a free space is generated in the buffer memory.

If it is determined, in S320, that the raster variable R has been requested (S320:YES), then in S350, the raster variable retrieve command is transmitted to the printer 30. Next in S360, the present time is stored as a current time Tb in the RAM 108, and in S370, the raster variable R is received from the printer 30. Afterwards, the routine proceeds to S330.

Next, the notification routine will be described while referring to the flowchart of FIG. 6. The notification routine is executed by the CPU 104 of the RIP 20 for notifying a user of an expected print completion time. The notification routine is repeatedly executed at a predetermined time interval or when requested by the user through the keyboard 23.

First in S400, the raster variable R is requested. In response to this request, the raster variable R is received from the printer 30 by the printer control routine as described above. Next, in S410, the process start time Ta, the present time Tb, and the raster variable R are retrieved. Then in S420, an expected print completion time is calculated using the formula:

Print completion time=$Ta+(Tb-Ta) \times (\text{total } R \text{ number})/R$ wherein, Ta is the start time;

Tb is the current time;

total R number is the total number of rasters in all print data; and

R is the raster variable.

It should be noted that the R total is calculated by processes (not shown) when the original data is converted into print data,.

Then, in S430, the deduced print completion time is displayed on the display 21 to notify the user of the deduced print completion time. In this way, the user can grasp the print completion time. Because the print completion time is predicted based on the raster variable R regardless of the transmission of print data to the printer 30, the deduced print completion time is accurate.

It should be noted that a remaining time duration required for completing print operations can be displayed rather than the deduced print completion time. Also, the print completion time or the remaining time duration can be notified to the user audibly by a synthesized voice, rather than by display.

Also, the present invention can be applied to a print system wherein a printer is directly connected to personal computer. In this case, the personal computer prepares original data and converts the original data into print data. The print data is then transmitted to the printer. The printer interprets the print data using a data interpreting routine stored in a RAM of the printer, and serially prints based on the print data.

Figure 7:
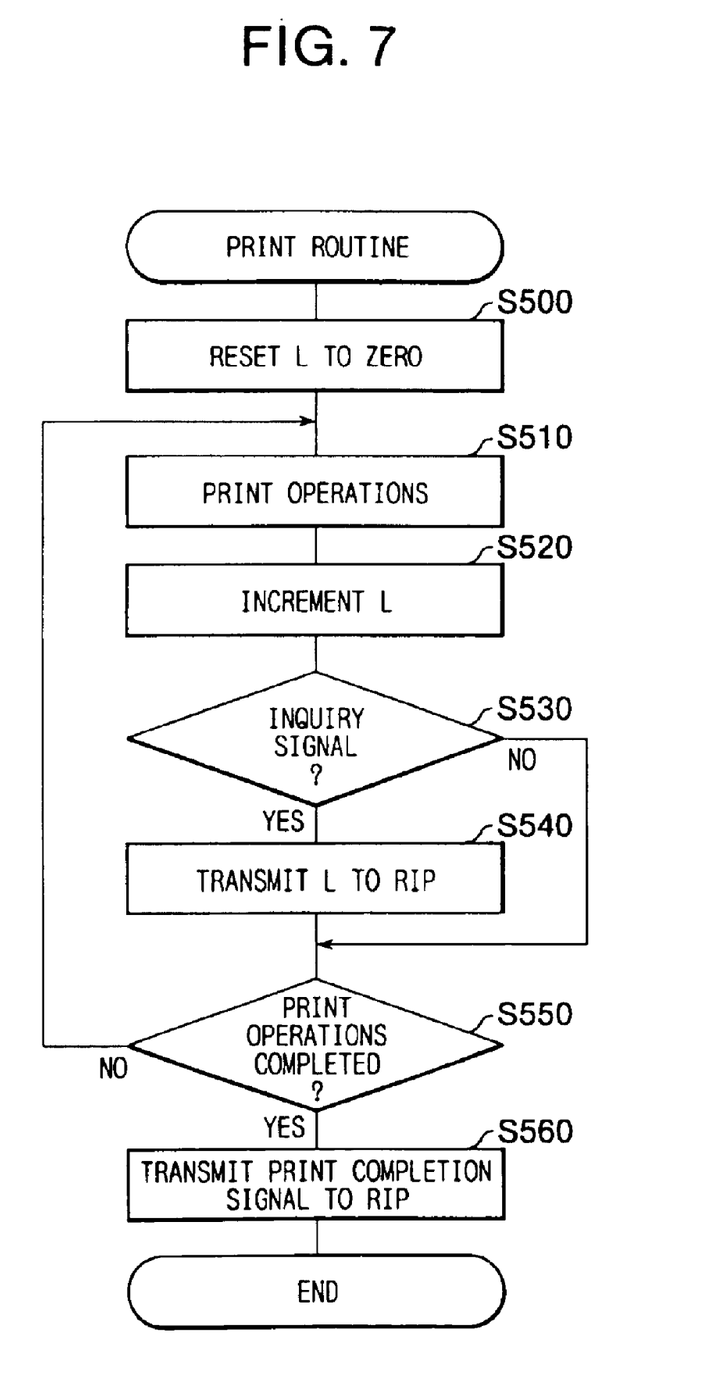
FIG. 7 is a flowchart representing a print routine according to a second embodiment of the present invention.
Figure 8:
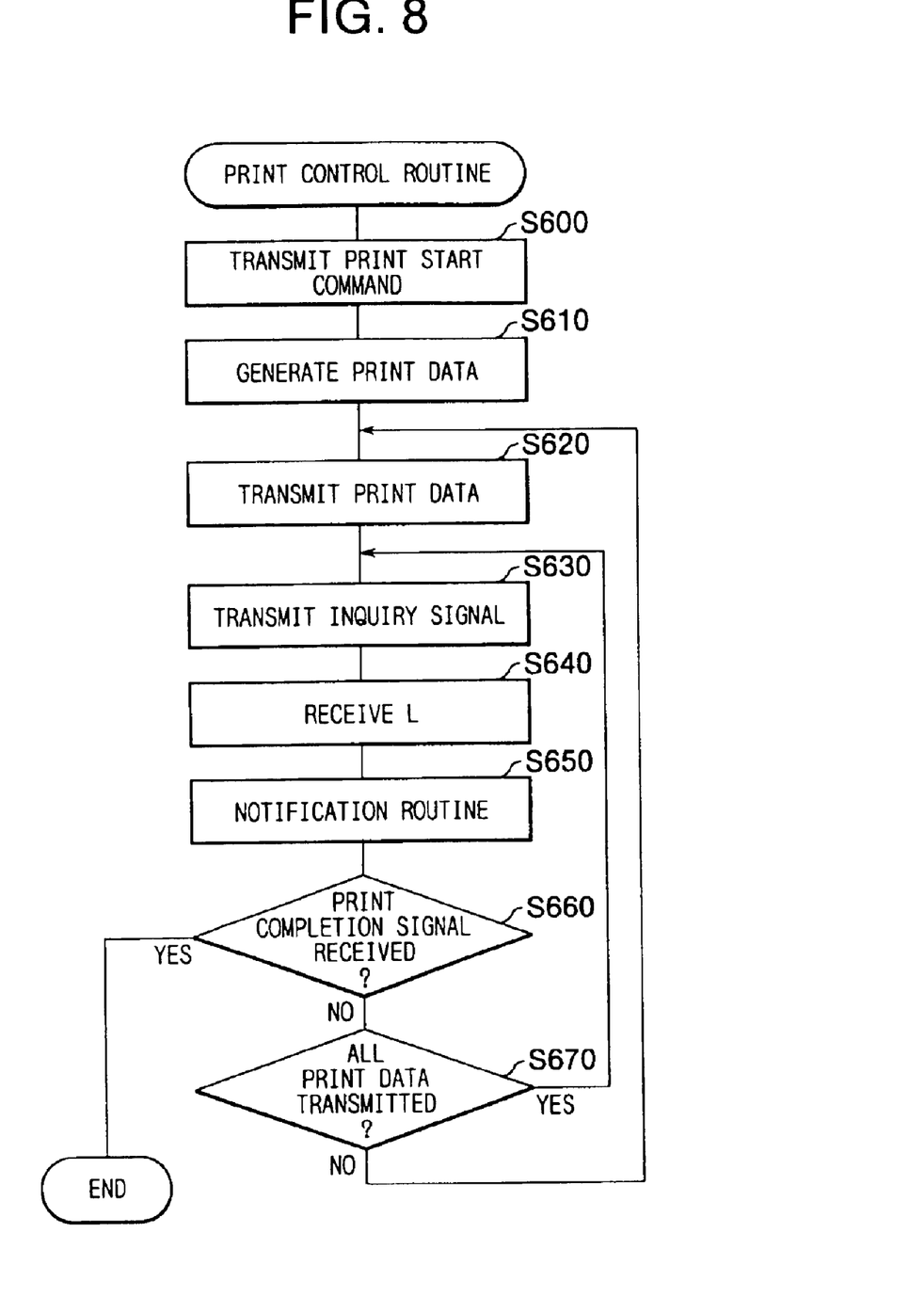
FIG. 8 is a flowchart representing a print control routine according to the second embodiment.
Figure 9:
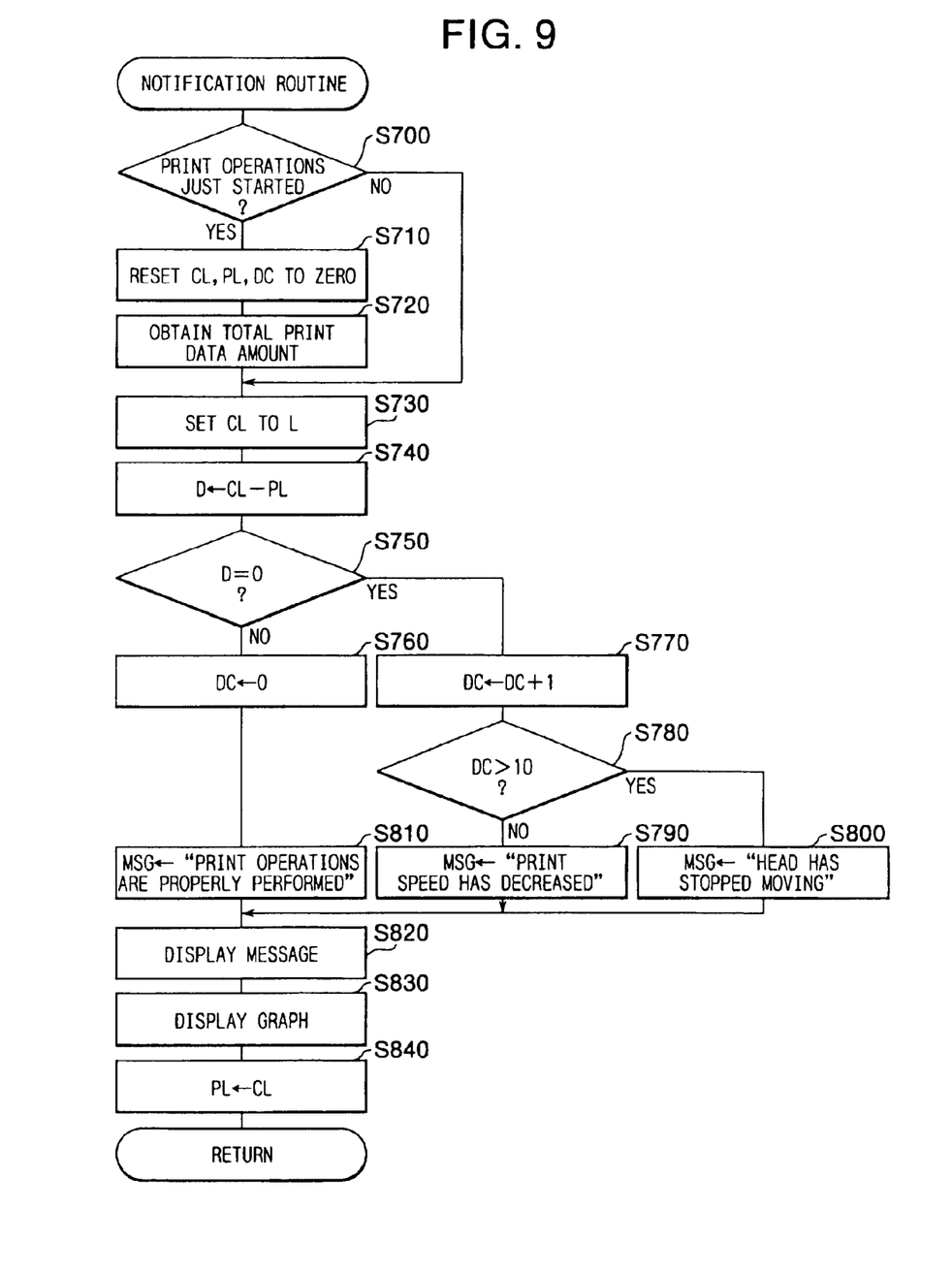
FIG. 9 is a flowchart representing a notification routine according to the second embodiment.

Next, control processes according to a second embodiment of the present invention will be described while referring to the flowcharts shown in FIGS. 7 to 9. The control processes include a print routine, a print control routine, and a notification routine.

First, the print routine will be described while referring to the flowchart shown in FIG. 7. The print routine is executed by the CPU 7Z of the printer 30 when the RIP 20 outputs a print start command to the printer 30.

When the print processes are started, first in S500, a line variable L is reset to zero. Next in S510, the print operations are performed for forming an image on a recording sheet 2 based on print data received from the RIP 20. During the print operations, the print head 56 is scanned in the main scanning direction while the recording sheet 2 is fed in the auxiliary scanning direction A.

Next in S520, the line variable L is incremented by the number of lines that have been printed in S520. Specifically, the sensor 59 detects the physical position of the print head 56, and the number of times the print head 56 has scanned is detected. Then, the number of printed lines is calculated using the detection result.

Next in S530, it is determined whether or not an inquiry signal has been received from the RIP 20. If so (S530:YES), then in S540, the line variable L, that is, the number of printed lines, is notified to the RIP 20. Then, the present routine proceeds to S550. On the other hand, if no inquiry signal has been received (S530:NO), the present routine proceeds directly to S550.

In S550, it is determined whether or not the print operations have been completed for all print data transmitted from the RIP 20. If so (S550:YES), the in S560, a print completion signal indicating that the printing has been completed is transmitted to the RIP 20. Then, the present routine is ended. On the other hand, if it is determined that the print operations have not been completed (S550:NO), then the present routine returns to S510.

Next, the print control routine will be described while referring to the flowchart shown in FIG. 8. The print control routine is executed by the CPU 104 of the RIP computer 24 based on the program stored in the RAM 108. The print control processes are stared when a print start command is received from the information processing terminal 10.

First in S600, a print start command is transmitted to the printer 30. Next in S610, original data received from the information processing terminal 10 is converted into print data. Then, in S620, the print data is serially transmitted to the printer 30 in synchronization with the progress of print operations in the printer 30. It is unnecessary that all print data be transmitted at one time.

Next in S630, the RIP 20 transmits an inquiry signal to the printer 30 for requesting the printer 30 to transmit the line variable L, and in S640, the RIP 20 receives the line variable L from the printer 30. Then in S650, the notification routine is executed for notifying the user of progress of the print operations based on the received line variable L. The notification routine will be described later in more detail.

Next in S660, it is determined whether or not the print completion signal has been received from the printer 30. If so (S660:YES), then the present routine is ended. On the other hand, if the print completion signal has not been received (S660:NO), then the present routine proceeds to S670. In S670, it is determined whether or not all print data has been transmitted to the printer 30. If so (S670:YES), then the present routine returns to S630 because there is no need to transmit any more print data. On the other hand, if not (S670:NO), the present routine returns to S620 to transmit remaining print data.

Next, the notification routine executed in S650 in FIG. 8 will be described while referring to the flowchart shown in FIG. 9. First in S700, it is determined whether or not print operations have just been started. That is, it is determined whether or not the present routine is executed for the first time during the print control routine shown in FIG. 8. If so, (S700:YES), then in S710, a current line variable CL, a previous line variable PL, and a difference variable DC are all reset to zero. It should be noted that the current line variable CL, the previous line variable PL, and the difference variable DC are stored in the RAM 108 of the RIP 20. Next in S720, the total amount of the print data is calculated based on the amount of print data which has been generated in S610 of FIG. 8. The total amount of the print data indicates the number of lines to be printed by the printer 30. Then, the present routine proceeds to S730. On the other hand, if it is determined in S700 that the print operations have not been just started (S700:NO), then the present routine proceeds directly to S730.

In S730, the current line variable CL is set to the line variable L received from the printer 30 in S640. Next in S740, a line difference D between the current line variable CL and the previous line variable PL is obtained by calculation. Then in S750, it is determined whether or not the line difference D is zero. If not (S750:NO), then in S760, the difference variable DC is set to zero. Then in S810, message data representing a message "Print operations are being properly performed" is set as a message variable MSG. Then, the present routine proceeds to S820.

On the other hand, if the line difference D equals to zero (S750:YES), this means that the print speed is zero, and the present routine proceeds to S770. In S770, the difference variable DC is incremented by 1. Then in S780, it is determined whether or not the difference variable DC is greater than ten. If so (S780:YES), then in S800, data representing a message "Head has stopped moving" is set as the message variable MSG. Then, the present routine proceeds to S820. On the other hand, if the difference variable DC is ten or less (S780:NO), then in S790, data indicating a message "Print speed has decreased" is set as the message variable MSG. Then, the present routine proceeds to S820.

Figure 10:
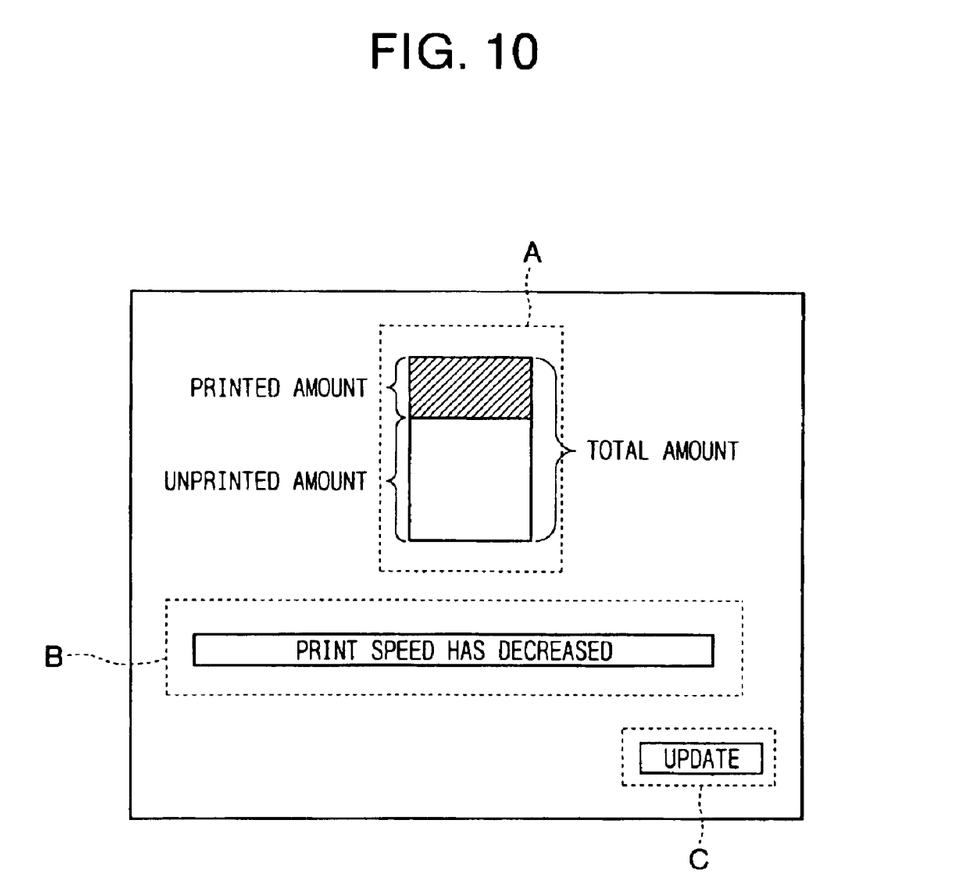
FIG. 10 is a schematic view showing a display screen indicating progress of printing.

In S820, a message based on the message variable MSG is displayed on the display 21 of the RIP 20. FIG. 10 shows a representative display screen of the display 21. As shown in FIG. 10, the display screen includes regions A, B, C. The message corresponding to the message variable MSG is displayed in the region B. Next in S830, a progress condition graph is displayed in the region A based on the total amount of the print data and the current line variable CL. The progress condition graph shows total amount of the print data divided into a printed amount region and an unprinted amount region.

Next in S840, the previous line variable PL is set to the current line variable CL, and the present routine returns.

As described above, according to the present embodiment, the print system SY can notify the user of the progress of the print operations based on various data from the printer 30. Therefore, the user can more accurately grasp the progress of print operations.

Also, because the printer 30 transmits the printed line variable L indicating the number of printed lines only when it receives the inquiry signal from the RIP 20, the RIP 20 can manage transmission of the notifying signals from the printers even when a plurality of printers are connected to the RIP 20. That is, the transmission timing of the notifying signals from different printers will not overlap.

The RIP 20 notifies the user of the progress of print operations by displaying the progress condition graph. Also, the RIP 20 notifies the user of whether the print operations are being properly executed or not. Therefore, the user can easily grasp the progress of the print operations without personally checking on the printer or making any determinations.

In the above-described second embodiment, the RIP 20 transmits the inquiry signal to the printer 30 at a predetermined timing. However, the RIP 20 can transmit the inquiry signal only when a request command is inputted by the user through the mouse 22 or the keyboard 23. For example, an update button can be displayed in the region C on the display screen of FIG. 10. The user can click on the update button using the mouse 22. With this configuration, the user can update the progress condition graph at a desired timing. In this case, because the printer 30 executes the above-described controls only when requested, the burden on the printer 30 will be lightened.

Also, the progress of print operations can be displayed on the display 11 of the information processing terminal 10 rather than on the display 21. In this case, instead of displaying a message and a graph in S820 and S830, the RIP 20 transmits the total amount of print data and the line variable L to the information processing terminal 10. Then, the information processing terminal 10 executes the processes of S820 and S830 shown in FIG. 9, thereby displaying a message and a graph on the display 11.

Also, the RIP 20 can notify the user of the progress of print operations using a graph different from the graph shown in FIG. 10. For example, the total amount of print data, the amount of printed print data, and the amount of unprinted print data can be displayed in graphs aligned with each other or can be displayed in graphs with line numbers. Also, percentage from 0 to 100 percent can be displayed with the graphs so that the user can more easily grasp what percentages has already been printed and what percentage still remains unprinted. Alternatively, a percentage ratio of printed amount or unprinted amount to total amount can be displayed. If print speed is known, the amount of time required for printing remaining print data can be displayed also.

Moreover, although in the above-described embodiments, the printer 30 detects the number of printed lines using the sensor 59, the number of printed lines can be calculated using software which calculates printed amount by detecting each time a single scan's worth of print data is supplied to the print head 56. Alternatively, the printed amount can be calculated by detecting a sheet feed amount using software or hardware, such as a sensor. However, when software is used, a time lag can be generated between the actual print timing and the detected timing. Therefore, the number of printed lines can be more accurately obtained by using the hardware.

Further, the progress of print processes can be notified audibly using a synthesized voice.

Also, the number of printed lines can be displayed in a message saying, for example, "Presently 100 lines have been printed". The user can use this information based on his or her past experience to determine, for example, that printing will be ended at about 200 lines, so printing is about half completed. However, in this case, the user cannot know the exact total amount of print data merely by knowing the printed amount. Therefore, the user personally needs to determine about how many lines will be printed in total.

Using the number of lines, any two of total data amount, printed amount, and unprinted amount can be displayed and comparison between these two can also be displayed. For example, the total data amount and the printed amount can be displayed side by side or in a graph-form overlapping each other. Using this manner of display, the user can judge how much printing has been completed. Alternatively, by displaying a percentage ratio of printed amount with respect to the total data amount, the user can grasp how much printing has been completed without judging by himself/herself.

Moreover, how much time remains before printing is completed can be determined based on unprinted amount and print speed, and the determined time is notified to the user. With this configuration, the user will not need to personally determine how much time is required until the printing is completed. Therefore, it is very convenient for the user.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A print progress notifying device comprising:
   detecting means for detecting a total raster number of print data of a print job;
   a timer that measures an elapsed time during print operations of said print job;
   counting means for counting a printed raster number during said elapsed time; and
   predicting means for predicting at least one of a remaining time duration required for completing the print operations and a completion time at which the print operations for the print data are completed, based on multiplying said elapsed time by said total raster number and dividing by said printed raster number.

2. The print progress notifying device according to claim 1, further comprising a printer for performing the print operations and a computer that is connected to the printed, wherein the counting means is provided to the printer, and the timer and the predicting means are provided to the computer.

* * * * *